United States Patent
Alam et al.

(10) Patent No.: US 10,143,030 B2
(45) Date of Patent: *Nov. 27, 2018

(54) METHODS AND APPARATUS TO IMPROVE A NETWORK CONNECTION VIA A CONNECTED VEHICLE

(71) Applicant: AT&T Mobility II, LLC, Atlanta, GA (US)

(72) Inventors: Iftekhar Alam, Atlanta, GA (US); Patrick Mascarenhas, Marietta, GA (US); Ming-Ju Ho, Alpharetta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/412,222

(22) Filed: Jan. 23, 2017

(65) Prior Publication Data

US 2017/0135060 A1    May 11, 2017

Related U.S. Application Data

(63) Continuation of application No. 14/850,563, filed on Sep. 10, 2015, now Pat. No. 9,565,712.

(51) Int. Cl.
*H04W 84/04*    (2009.01)
*H04W 76/20*    (2018.01)
(Continued)

(52) U.S. Cl.
CPC .......... *H04W 76/20* (2018.02); *H04W 4/046* (2013.01); *H04W 4/80* (2018.02); *H04W 8/183* (2013.01);
(Continued)

(58) Field of Classification Search
CPC ......... H04W 36/0015; H04W 28/0226; H04W 24/08; H04L 12/40; G07C 9/00126; B60R 25/01; G08B 13/00
(Continued)

(56) References Cited

U.S. PATENT DOCUMENTS 8,525,684 B2   9/2013 Fong et al.
8,611,317 B2  12/2013 Banerjea et al.
(Continued)

OTHER PUBLICATIONS

United States Patent and Trademark Office, "Non-Final Office Action", issued in connection with U.S. Appl. No. 14/850,563, dated May 17, 2016 (10 pages).
(Continued)

*Primary Examiner* — Phuoc H Doan
(74) *Attorney, Agent, or Firm* — Hanley, Flight and Zimmerman, LLC

(57) ABSTRACT

Methods and apparatus are disclosed to improve a network connection of a cellular-enabled device via a connected vehicle. An example method disclosed herein includes establishing a first connection between the cellular-enabled vehicle and the first cellular-enabled device using a short distance radio frequency protocol. The first connection is based on a first connection relationship. The example method also includes sending a registration message to the cellular-enabled vehicle from the cellular-enabled device. The example method also includes detaching the cellular-enabled device from the cellular network. The example method also includes routing first cellular data associated with the first cellular-enable device to the cellular network via the cellular-enabled vehicle.

20 Claims, 7 Drawing Sheets

(51) Int. Cl.
| | |
|---|---|
| *H04W 76/14* | (2018.01) |
| *H04W 76/15* | (2018.01) |
| *H04W 8/18* | (2009.01) |
| *H04W 4/80* | (2018.01) |
| *H04W 4/04* | (2009.01) |
| *H04W 12/04* | (2009.01) |
| *H04W 48/04* | (2009.01) |
| *H04W 60/04* | (2009.01) |
| *H04W 60/06* | (2009.01) |
| *H04W 76/30* | (2018.01) |
| *H04W 60/00* | (2009.01) |
| *H04W 88/06* | (2009.01) |

(52) U.S. Cl.
CPC ........... *H04W 12/04* (2013.01); *H04W 48/04* (2013.01); *H04W 60/04* (2013.01); *H04W 60/06* (2013.01); *H04W 76/14* (2018.02); *H04W 76/15* (2018.02); *H04W 60/00* (2013.01); *H04W 76/30* (2018.02); *H04W 88/06* (2013.01)

(58) Field of Classification Search
USPC .............. 455/437, 562.1; 701/1, 2; 370/332; 340/545.1
See application file for complete search history.

(56) References Cited

U.S. PATENT DOCUMENTS

| | | | |
|---|---|---|---|
| 8,761,668 | B2 | 6/2014 | Park |
| 8,774,756 | B2 | 7/2014 | Bradburn |
| 8,886,181 | B2 | 11/2014 | Ganesan |
| 9,008,063 | B2 | 4/2015 | Cui et al. |
| 2005/0227724 | A1 | 10/2005 | Tsai |
| 2006/0089757 | A1* | 4/2006 | Yoshimura ............. H04L 12/40 701/2 |
| 2010/0087144 | A1 | 4/2010 | Korenshtein |
| 2012/0100806 | A1 | 4/2012 | Hall |
| 2014/0274064 | A1* | 9/2014 | Al-Shalash ........... H04W 24/08 455/437 |
| 2014/0308939 | A1 | 10/2014 | Goldman et al. |
| 2014/0323163 | A1 | 10/2014 | Venkatraman et al. |
| 2015/0011220 | A1 | 1/2015 | Buckle et al. |
| 2015/0045054 | A1 | 2/2015 | Emadzadeh et al. |

OTHER PUBLICATIONS

United States Patent and Trademark Office, "Notice of Allowance", issued in connection with U.S. Appl. No. 14/850,563, dated Sep. 29, 2016 (8 pages).

\* cited by examiner

METHODS AND APPARATUS TO IMPROVE A NETWORK CONNECTION VIA A CONNECTED VEHICLE

CROSS REFERENCE TO RELATED APPLICATIONS

This patent arises from a continuation of U.S. patent application Ser. No. 14/850,563, filed Sep. 10, 2015, now U.S. Pat. No. 9,565,712, which is hereby incorporated herein by reference in its entirety.

FIELD OF THE DISCLOSURE

This disclosure relates generally to cellular network connections and, more particularly, to methods and apparatus to improve a network connection via a connected vehicle.

BACKGROUND

Increasingly, vehicles are manufactured with cellular voice and data network radio devices and an external antenna to facilitate a connection to a network. These vehicles referred to as connected vehicles that have their own subscriber identification modules (SIMs) that facilitate connection to the cellular network. In particular, the SIMs, when activated, allow the connected vehicle to connect to a cellular data network via a cellular protocol (e.g., Global System for Mobile Communications (GSM), Universal Mobile Telecommunications System (UMTS), Evolution-Data Optimized (EDVO), Enhanced Data rates for GSM Evolution (EDGE), Long Term Evolution (LTE), etc.) which may be used for navigation, multimedia streaming, Internet browsing, etc. via a display on an infotainment head unit located in the vehicle. However, many connected vehicle owners do not activate the SIM in their connected vehicle.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
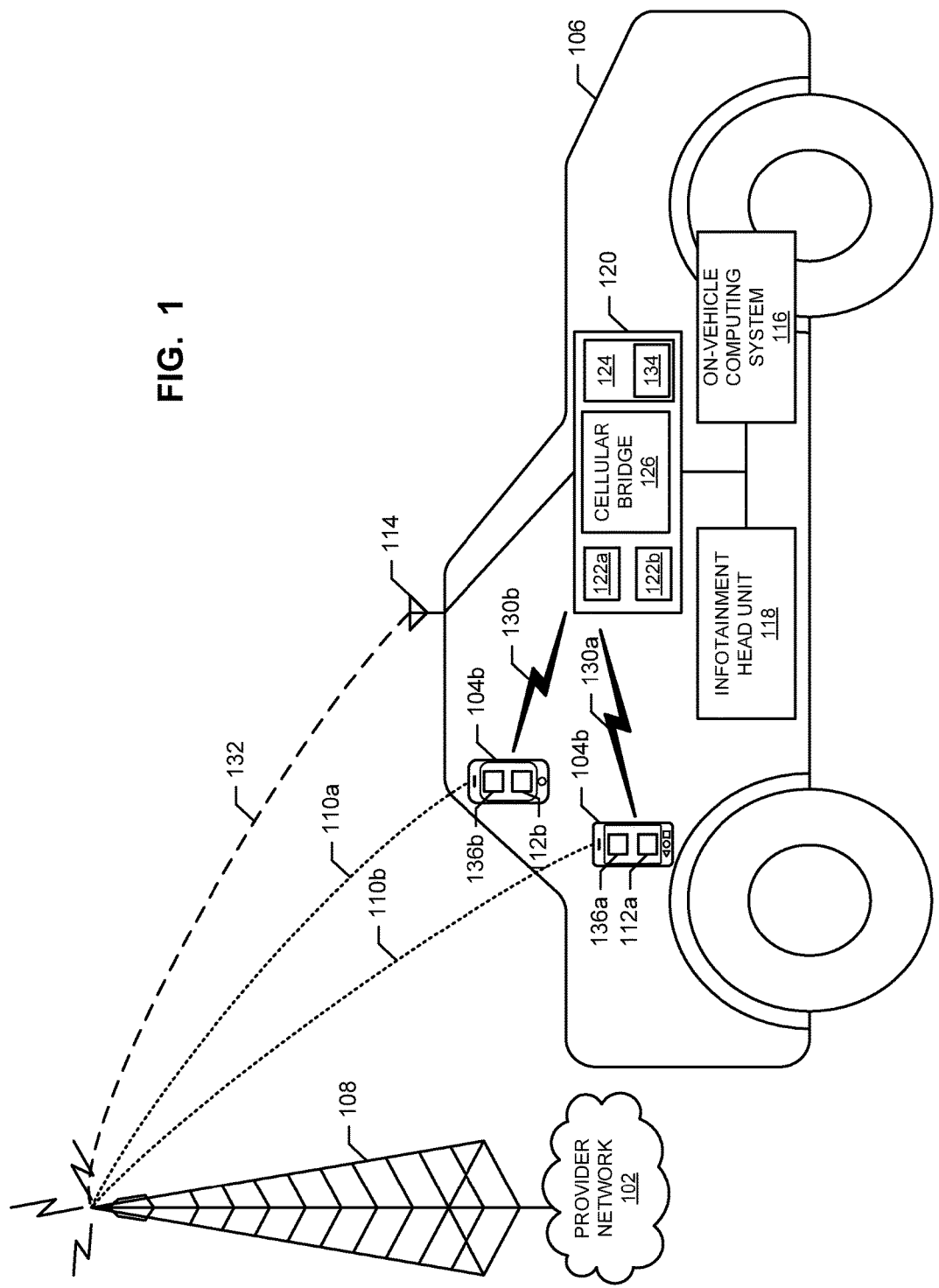
FIG. 1 illustrates an example system operating in accordance with the teaching of this disclosure to improve a network connection via a connected vehicle.

Examples disclosed herein may be used to improve a network connection of a cellular-enabled device via a connected vehicle. Cellular-enabled devices are portable devices (e.g., smartphones, tablets, laptops, etc.) (sometimes referred to herein as "user equipment (UE)") equipped with cellular network antenna(s) and software to facilitate connecting to a cellular network. As used herein, a connected vehicle is any vehicle (e.g., a car, a truck, boat, etc.) equipped with cellular network antenna(s) and software to facilitate connecting to a cellular network. As used herein, a cellular network includes a voice service and/or a data service.

Vehicles can be poor radio frequency (RF) environments for UEs. For example, electronics in the vehicle emit RF signals that can cause interference. Additionally, the metallic structure of the vehicle can attenuate the strength of signals sent and received by the UE. To compensate for interference and attenuation, cellular networks use higher power signals and/or more RF spectrum to communicate between the UE and the cellular network. However, increasing signal power creates more interference that requires more network management. Additionally, increasing spectrum use decreases the capacity of the cellular network. Furthermore, communicating using a higher power signal causes a substantial drain on the UE battery.

As disclosed in detail, a UE and a connected vehicle establish a connection relationship (sometimes referred to as "pairing") over a short distance wireless connection (e.g., a Wi-Fi® connection, a Bluetooth® connection, a Zigbee® connection, etc.). Subsequently, when the UE is in range of the connected vehicle, the UE and the connected vehicle initiate the short distance wireless connection. In some examples, the short distance wireless connection is initiated without any further prompting by the user of the UE. As used herein, range refers to a maximum distance at which two devices (e.g., the UE, the connected vehicle, etc.) can connect. The range is affected by the RF environment, the power at which the wireless signals are broadcast, and the design of the respective antennas.

As disclosed in more detail below, when the short distance wireless connection is initiated, the UE and the provider network communicate via the connected vehicle as if the UE and the provider network were directly connected. To do so, the connected vehicle requests a subscriber identifier (e.g., an international mobile subscriber identity (IMSI), etc.) from the UE. Additionally, the connected vehicle sends a request to the UE to detach from the provider network. As used herein, detaching is a process to inform the provider network that a device (e.g., the UE, the connected vehicle, etc.) is not reachable. The connected vehicle then attaches to the provider network using the subscriber identifier received from the UE. As used herein, attaching is a process to establish a connection relationship (e.g., become authorized to use the network, obtain information to transmit and receive data on the cellular network, receive a temporary mobile subscriber identification (TMSI), etc.) between the provider network and the device (e.g., the UE, the connected vehicle, etc.).

The connected vehicle routes cellular voice and/or data network communications between the UE and the cellular network via the short distance wireless connection. Because the cellular antenna of the connected vehicle is better than the cellular antenna of the UE, the network uses a lower power signal to connect to the connected vehicle, thus easing the burden on the network. Additionally, because the connected vehicle can broadcast a signal with more power than the UE, the capacity and the range of the provider network is increased.

As disclosed in detail, to establish a connection relationship, the UE and the connected vehicle discover each other via discovery mechanisms of a protocol corresponding to the short distance wireless connection. After discovery, the UE and the connected vehicle exchange credentials. For example, a passkey may be entered into the UE (e.g., via a touch screen) and into the connected vehicle (e.g., via an infotainment head unit). The UE and the connected vehicle store the identity of each other and the associated credentials. In some examples, to prevent unauthorized access (e.g., eavesdropping) to the connection, the connected vehicle may enforce a minimum level of security capability before the connection relationship is established. In some such examples, the connected vehicle refuses to form a connection relationship with the UE if the UE is not able to support a certain security mode and/or certain level of encryption.

When the UE is in range of the connected vehicle, the connected vehicle establishes a connection with the UE over a short distance RF protocol. The connected vehicle requests the subscriber identifier (e.g., the IMSI, the TMSI, etc.) from the UE. In some examples, the subscriber identifier is stored on a subscriber identification modules (SIM) card installed in the UE. Additionally, the connected vehicle sends a request to the UE to detach from the cellular network. The connected vehicle attaches to the cellular network using the subscriber identifier received from the UE. In some examples, to minimize a chance that the connected vehicle is able attach to the provider network when the UE is not connected, after receiving a temporary subscriber identifier (e.g., the TMSI) from the network, the connected vehicle deletes the subscriber identifier. In such examples, if the connected vehicle needs the subscriber identifier again, the connected vehicle requests the subscriber identifier from the UE again. Once the connected vehicle attaches to the network using the subscriber identifier, the connected vehicle acts in relation to the cellular network as if the connected vehicle was the UE. For example, if a tower broadcasts a paging message with the subscriber identifier associated with the UE, the connected vehicle sends a response. Additionally, the cellular network provider accounts for network usage by the connected vehicle as if it were being used by the corresponding UE.

In examples disclosed below, the connected vehicle routes data between the UE and the cellular network via the short distance wireless connection. For example, if a user is browsing the Internet on the UE, the UE forwards the data packets to the connected vehicle via the short distance wireless connection, and the connect vehicle transmits the data packets to the provider network via the cellular network connection. In examples disclosed below, if the short distance RF protocol connection with the UE ends, the connected vehicle detaches from the cellular network. In some examples, the connected vehicle deletes the subscriber identifier received from the UE and/or the temporary subscriber identifier received from the cellular network.

In some examples disclosed below, the connected vehicle manages connections for multiple UEs. In such examples, the connected vehicle attaches to the provider network multiple times using the subscriber identifications of the UEs in communication with the connected vehicle. In some such examples, the connected vehicle mains one-to-many short distance wireless connections. For example, if the short distance wireless connections are based on the Bluetooth® protocol, the connected vehicle functions as the master device, and the UEs function as the slave devices. In some examples, the connected vehicle generates a lookup table so that packets from a first one of the UEs are routed to the network using a first connection corresponding to a first one of the subscriber identifiers, and packets from a second one of the UEs are routed to the cellular network using a second connection corresponding to a second one of the subscriber identifiers, etc.

In some examples, the connected vehicle has an associated subscriber identifier. In such examples, the connected vehicle attaches to the network using its subscriber identifier when the connected vehicle is powered on. In such examples, when the connected vehicle maintains the lookup table, the subscriber identifier of the connected vehicle is also on the lookup table. Alternatively, in some examples, the connected vehicle does not have an associated subscriber identifier (e.g., the cellular service was not activated for the connected vehicle). However, in some such examples, the connected vehicle may still attached to the cellular network using the subscriber identifier(s) of the connected UE(s).

FIG. 1 illustrates an example system operating in accordance with the teaching of this disclosure to improve communication between a provider network 102 and UE(s) 104a, 104b via a connected vehicle 106. The example system includes the example provider network 102, the example UE(s) 104a, 104b, the example connected vehicle 106, and an example cellular tower 108. The example UE(s) 104a, 104b are portable devices (e.g., smart phones, feature phones, tablets, laptops, etc.) that include antenna(s) used to communicate with the cellular towers 108 to form cellular network connections 110a, 110b. The example cellular network connections 110a, 110b communicatively couple the example UE(s) 104a, 104b to the example provider network 102. The UE(s) 104a, 104b also include(s) an example SIM 112a, 112b which includes a subscriber identifier (e.g., an IMSI, etc.) associated with the corresponding UE 104a, 104b and an authentication key, etc. In some examples, the SIM 112a, 112b is stored in an electronic circuit (e.g., a SIM card, etc.). Alternatively, in some examples the SIM 112a, 112b is stored in a protected portion of non-volatile memory.

Cellular network providers (e.g., AT&T, NTT DoCoMo, Vodaphone, Orange, etc.) of the provider network 102 associate the subscriber identifier included in the SIM 112a, 112b to subscriber information to determine whether the UE(s) 104a, 104b is/are authorized to access the provider network 102, to allow the UE(s) 104a, 104b to attach to the provider network 102, to associate usage of the network provider 102 to a subscriber account, and to communicate with the UE(s) 104a, 104b, etc.

To prevent eavesdropping, when one of the example UEs 104a, 104b attaches to the example provider network 102 and/or connects to a new cellular tower 108, the example provider network 102 assigns a temporary subscriber identifier (e.g. a TMSI, etc.) to the UE 104a, 104b. Additionally, from time to time, the provider network 102 may assign a new temporary subscriber identifier to the one of the UEs 104a, 104b. The example provider network 102 uses the subscriber identifier and/or the temporary subscriber identifier when communicating with the UE(s) 104a, 104b. For example, when the provider network 102 has data to transmit to the UE 104a, 104b, the provider network 102, via the cellular tower 108, sends a paging message that includes the subscriber identifier or the temporary subscriber identifier associated with the UE 104a, 104b.

In the illustrated example, the connected vehicle 106 includes one or more example antennae 114, an example on-vehicle computing system 116, an example infotainment head unit 118, and an example vehicle communications platform 120. The example antenna(s) 114 include a cellular antenna. In some example, the antenna(s) 114 also include a Global Positioning System (GPS) antenna, an RF antenna (e.g. for terrestrial radio), and/or a satellite antenna (e.g., for satellite radio).

The example on-vehicle computing system 116 controls low-level systems (e.g., door lock controls, headlight controls, transmission controls, climate controls, etc.) connected to a controller area network (CAN) bus. Additionally, the example on-vehicle computing system 116 is communicatively coupled to the infotainment head unit 118 to control media and/or applications being displayed on the infotainment head unit 118. The example on-vehicle computing system 116 also processes input from the example infotainment head unit 118 to adjust the operation of the low-level systems (e.g., the climate controls, etc.). In some examples, the on-vehicle computing system 116 also include data storage (e.g., hard disks, solid state drives, etc.) to store media (e.g., movies, music, television programs, podcasts, etc.), system firmware, navigation data, diagnostic information, data collected by data collection systems (e.g., cameras mounted externally on the vehicle 106, weather data collection, etc.), etc. In some example, the on-vehicle computing system 116 also compiles diagnostic information (e.g., codes) from the low-level systems to, for example, be communicated via an on-board diagnostic (OBD-II) port.

In the illustrated example, the infotainment head unit 118 includes a console display to communicate information to the occupants of the connected vehicle 106. For example, the center console display may display a menu system and/or applications (e.g., a navigation application, a music streaming application, a radio application, etc.). The example infotainment head unit 118 is communicatively coupled to the example vehicle communications platform 120. In some examples, the center console display includes a touchscreen to receive input from the occupants of the vehicle. For example, the center console display may receive menu commands to adjust the temperature of the climate control system. Alternatively or additionally, in some examples, the infotainment head unit 118 includes analog controls (e.g., buttons, knobs, etc.) to receive input. During an initial discovery and pairing process, the example infotainment head unit 118 is used to, for example, input authentication credentials and/or passkeys. In some examples, the infotainment head unit 118 also includes peripheral devices (e.g. a compact disc (CD) player, a digital versatile disc (DVD) player, etc.) and/or inputs for wired connections (e.g., an auxiliary port, a universal serial bus (USB) port, etc.).

The example vehicle communications platform 120 manages the wireless communication of the connected vehicle 106. In the illustrated example, the vehicle communications platform 120 includes example wireless communication devices 122a, 122b, an example cellular network controller 124, and an example cellular bridge 126. The example wireless communication devices 122a, 122b include antenna(s) and/or radio(s) compatible with one or more short distance RF protocols. For example, a first one of the wireless communication devices 122a, 122b may be a Bluetooth® module, and a second one of the wireless communication devices 122a, 122b may be a Wi-Fi® module. The example wireless communication devices 122a, 122b are used by the example cellular bridge 126 to establish wireless connection(s) 130a, 130b to the UE(s) 104a, 104b. In some examples, the example cellular bridge 126 uses one of the wireless communication devices 122a, 122b (e.g. a Bluetooth® compatible antenna, etc.) to establish a one-to-one connection with one of the UEs 104a, 104b. Alternatively, in some examples, the example cellular bridge 126 uses one of the wireless communication devices 122a, 122b (e.g. a Bluetooth® compatible antenna, etc.) to establish a one-to-many connection with the UEs 104a, 104b. Alternatively, in some examples, example cellular bridge 126 uses one of the wireless communication devices 122a, 122b (e.g., a Wi-Fi® compatible antenna etc.) to establish a wireless local area network (WLAN) to which the UE(s) 104a, 104b may connect.

The example wireless communication devices 122a, 122b have a range at which the corresponding short distance RF protocol is able to maintain the wireless connection(s) 130a, 103b with the UE(s) 104a, 104b. The example cellular bridge 126 may configure the broadcast power of the wireless communication devices 122a, 122b to limit the range of the wireless connection 130a, 130b to cover an area substantially proximate (e.g. one meter, two meters, etc.) the connected vehicle 106.

In the illustrated example of FIG. 1, the cellular network controller 124 manages a network connection 132 between the connected vehicle 106 and the cellular tower 108. The example cellular network controller 124 is communicatively coupled to the antenna(s) 114. In the illustrated example, cellular network controller 124 includes hardware and/or software to communicate with the cellular tower 108 using one or more cellular network protocols (e.g., Global System for Mobile Communications (GSM), Universal Mobile Telecommunications System (UMTS), Evolution-Data Optimized (EDVO), Enhanced Data rates for GSM Evolution (EDGE), Long Term Evolution (LTE), etc.)

In the illustrated example, the cellular network controller 124 includes connected vehicle identification module (CVIM) 134. In some examples, the CVIM 134 is an integrated circuit installed into the cellular network controller 124. Alternatively, in some examples, the CVIM 134 may be stored in protected non-volatile memory of the cellular network controller 124. The CVIM 134 stores information used to authenticate and identify the connected vehicle on the provider network 102, including a subscriber identifier (e.g., an IMSI) and an authentication key. In some examples, an owner of the connected vehicle 106 has activated (e.g. registered) the CVIM 134 with a cellular network provider. In such examples, the cellular network controller 124 attaches to the provider network 102 based on the CVIM 134. Alternatively, in some examples, the owner of the connected vehicle 106 has not activated the CVIM 134 with a cellular network provider. In such examples, the connected vehicle 106 does not normally attach to the provider network 102.

The example cellular bridge 126 manages communication between the example UE(s) 104a, 104b communicatively coupled to one of the wireless communication devices 122a, 122b via the wireless connection 130a, 130b and the provider network 102 communicatively coupled to the cellular network controller 124. In the illustrated example, the cellular bridge 126 is communicatively coupled to the example wireless communication devices 122a, 122b and the example cellular network controller 124.

As disclosed in more detail below in FIG. 2, the example cellular bridge 126 requests information (e.g. the subscriber identifier, the authentication key, etc.) from the UE(s) 104a, 104b so that the cellular network controller 124 is able to attach to the provider network 102 using the credentials associated with the UE(s) 104a, 104b. When the example cellular network controller 124 is attached to the example provider network 102, the example cellular bridge 126 routes data to the associated UE(s) 104a, 104b received from the provider network 102 (e.g. via the example cellular network controller 124). Additionally, the example cellular bridge 126 routes data from the UE(s) 104a, 104b to the provider network 102 (e.g. via the example cellular network controller 124). In some examples, the cellular bridge 126 manages communication between the provider network 102 and multiple UEs 104a, 104b. In such a manner, the example cellular bridge 126 facilitates the UE(s) 104a, 104b using the antenna(s) 114 of the connected vehicle 106 to communicate to the provider network 102.

The UEs 104a, 104b of the illustrated example include an example cellular router 136a, 136b. When the UE 104a, 104b is detached from the provider network 102, the example cellular router 136a, 136b routes data packets that would be sent to the provider network 102 over the cellular connection 110a, 110b to the wireless communication device 122a, 122b via the wireless connection 130a, 130b instead. Additionally, the example cellular router 136a, 136b provides an interface to an operating system (e.g., Google Android™, Apple® iOS, etc.) on the UE 104a, 104b that allows applications (e.g., dialer applications, web browsing applications, etc.) executing on the UE 104a, 140b to send and receive data through the example cellular router 136a, 136b.

Figure 2:
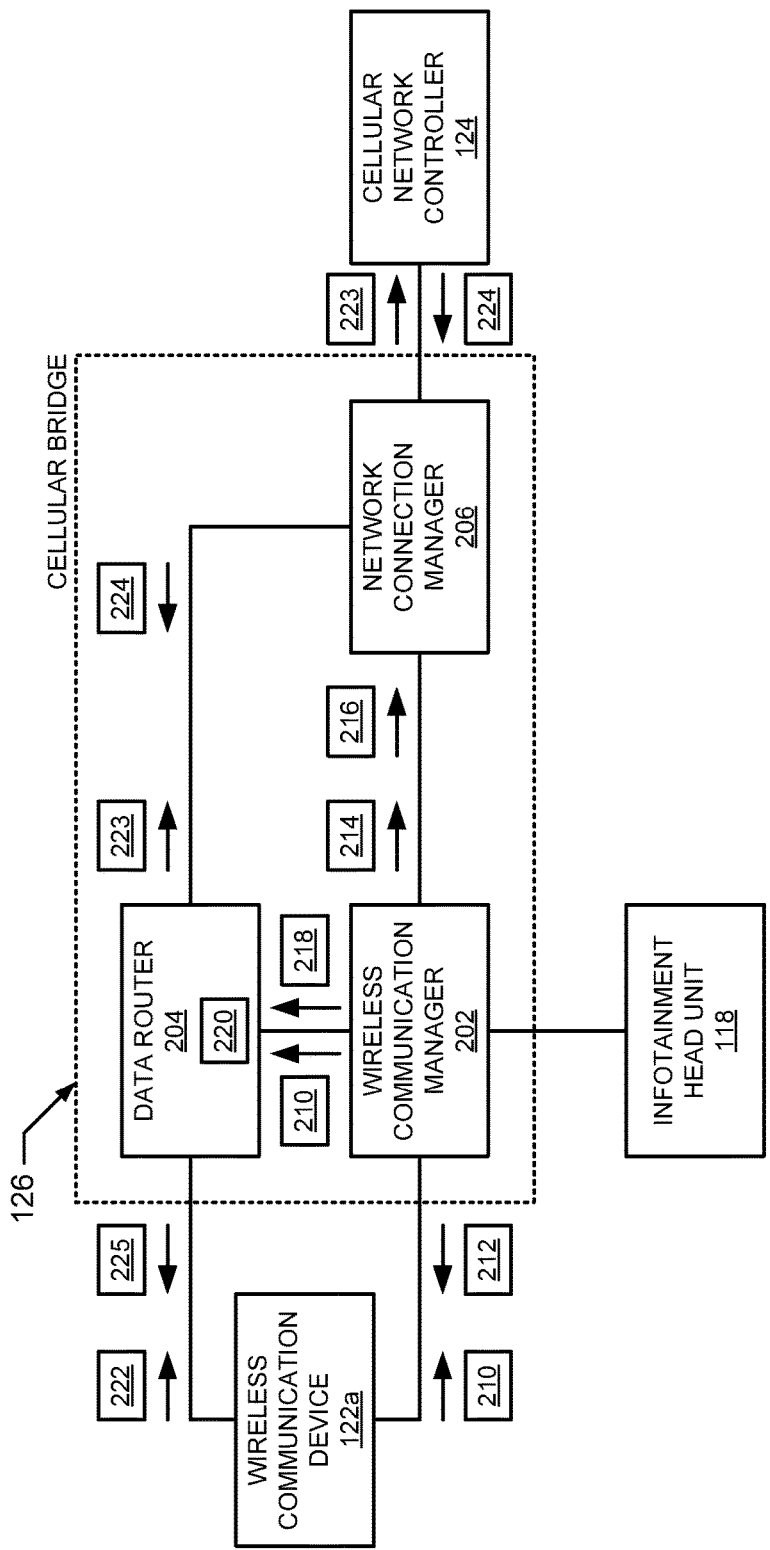
FIG. 2 illustrates an example implementation of the example cellular bridge of FIG. 1.

FIG. 2 illustrates an implementation of the example cellular bridge 126 of FIG. 1. In the illustrated example, the cellular bridge 126 includes an example wireless communication manager 202, an example data router 204, and an example network connection manager 206. The example cellular bridge 126 facilitates communication between the UE(s) 104a (FIG. 1) and the provider network 102 (FIG. 1).

In the illustrated example, the wireless communication manager 202 is communicatively coupled to the wireless communication device 122a and the infotainment head unit 118. The example wireless communication manager 202 includes communication protocols (e.g., as defined by the Institute of Electrical and Electronics Engineers (IEEE) 802.15.1 (Bluetooth®) standard, the IEEE 802.11 (Wi-Fi®) standard, and/or the IEEE 802.15.4 (Zigbee®) standard, etc.) used to communicated via the wireless connections 130a (FIG. 1).

The wireless communication manager 202 of the illustrated example establishes the connection relationship (e.g. pairs) with the example UE(s) 104a. The connection relationship is used at a future time to establish the wireless connection(s) 130a between the UE 104a, and the wireless communication device 122a. To establish the connection relationship, the example wireless communication manager 202 and the example UE 104a perform discovery has specified in the particular short distance RF protocol. In some examples, example wireless communication manager 202 manages authentication credentials (e.g., a password, a username, etc.) associated with the particular short distance RF protocol (e.g. through a setup process via the example infotainment head unit 118) to establish the wireless connection(s) 130a. In such examples, the connection relationship is stored (e.g., in non-volatile memory, etc.) by the UE 104a and the wireless communication manager 202 after (i) the authentication credentials are entered into the example UE 104a, and (ii) the authentication credentials authenticated by the wireless communication manager 202.

Alternatively, in some examples, the wireless communication manager 202 and the UE 104a exchange a passkey selected (e.g. via the infotainment head unit 118) by a user of the UE 104a and the connected vehicle 106. For the wireless communication manager 202 to establish the connection relationship, in such examples, the identical passkey is entered into the UE 104a (e.g., via a touchscreen, etc.). The example passkey is a numeric value that is not predefined by the wireless communication manager 202. In some such examples, the wireless communication manager 202 establishes a minimum length of the passkey (e.g., four digits, eight digits, etc.). The connection relationship is stored by the UE 104a and the wireless communication manager 202 after (i) the passkey is entered into the example UE 104a and the wireless communication manager 202, (ii) authentication values based on the passkey are exchanged between the example UE 104a and example wireless communication manager 202, and (iii) the authentication values are authenticated by the example UE 104a and the wireless communication manager 202.

In the illustrated example, once a connection relationship is established between wireless communication manager 202 and the UE 104a, when the UE 104a is within range, the wireless communication manager 202 establishes the wireless connection 130a with the UE 104a that communicatively couples the UE 104a and the wireless communication device 122a. In some examples, wireless communication manager 202 establishes the wireless connection(s) 130a without a further intervention from a user. As used herein, enabling the short distance RF protocol on the UE 104a is not considered further intervention from the user.

The example wireless communication manager 202 detects when the UE 104a connect or disconnect from the example wireless communication manager 202. When the example wireless communication manager 202 detects that the wireless connection 130a is established with the example UE 104a, the example wireless communication manager 202 sends a registration request 209 to the connected UE 104a. In response, the example wireless communication manager 202 receives a registration message 210 from the connected UE 104a.

The example registration message 210 includes the subscriber identifier and the authentication key stored in the SIM 112a of the UE 104a. In the illustrated example, the UE connection manager 202 forwards the registration message 210 to the example data router 204. The example wireless communication manager 202 sends an UE detach request 212 to the UE 104a. Additionally, the example wireless communication manager 202 sends a network attach request 214 to the example network communication manager 206.

In some examples, the short distance RF communication protocol used to communicate via the wireless connection 130a has security configurations that provide a level of security (e.g. via encryption, via frequency hopping, etc.) to prevent interception of data packets sent between the wireless communication device 122a and the UE(s) 104a. In some examples, the security level being used by the short distance RF communication protocol is determined by the capabilities of the UE(s) 104a. As such, in some such examples, when establishing the wireless connection 130a with the UE 104a, the wireless communication manager 202 uses the security configuration that provides the highest level of security that the UE(s) 104a is compatible of using. For example, a security configuration may specify a bit-size of an encryption key and/or at which point in the pairing process to secure the connection.

In the illustrated example, when the example wireless communication manager 202 detects that the UE 104a has disconnected (e.g., has terminated the wireless connection 130a), the example wireless communication manager 202 sends a network detach request 216 to the network connection manager 206. The network detach request 216 includes the subscriber identifier of the disconnected UE 104a. Additionally, in some such examples, the wireless communication manager 202 sends a delete request 218 to the data router 204 to delete the entry on the account table 220 corresponding to the disconnected UE 104a. In such a manner, the connected vehicle 106 does not used the credentials of the UE 104a after the UE 104a disconnects from the cellular bridge 126.

In the illustrated example, the data router 204 is communicatively coupled to the wireless communication device 122a. The example data router 204 maintains an account table 220 that associates the registration message 210 received from the wireless communication manager 202 with a wireless communication device identifier that identifies the wireless communication device 122a to which the UE 104a is connected. In some examples, the wireless communication device 122a maintains wireless connections 130a with multiple UE 104a. In some such examples, the data router 204 also includes a connection identifier on the account table 220 that associates the registration message 210 with the connection identifier of the corresponding wireless connection 130a. When a temporary subscriber identifier is received from the provider network 102, the example data router 204 also associates the temporary subscriber identifier on the account table 220 with the corresponding registration message 210. In some examples, when the CVIM 134 (FIG. 1) of the connected vehicle 106 is activated, the example data router 204 includes the subscriber identifier and the authentication key associated with the CVIM 134 on the account table 220. In such examples, the network connection manager 206 and the UE connection manager 202 treat inbound and outbound data packets from the connected vehicle 106 as if the connected vehicle was the UE 104a.

In the illustrated example, after the wireless connection 130a has been established, the data router 204 receives outbound messages 222 from the UE 104a. The example outbound message 222 includes a data packet to be sent to the network provider 102 and the subscriber identifier associated with the example UE 104a that originated the outbound message 222. The example data router 204 transforms the outbound message into a format to be sent via the cellular network protocol. The example data router 204 determines whether a temporary subscriber identifier has been assigned to the example UE 104a based on the example account table 220. If a temporary subscriber identifier has been assigned to the example UE 104a, the example data router 204 replaces the subscriber identifier with the temporary subscriber identifier in an example modified outbound message 223. The example data router 204 then sends the outbound message 222 and/or the modified outbound message 223 to the example network connection manager 206 to be send to the provider network 102.

In the illustrated example of FIG. 2, the data router 204 receives an inbound message 224 from the example network connection manager 206. The inbound messages 224 contain voice and/or data packets originating from the voice and/or data network of cellular operator. For example, the inbound messages 224 may contain data packets from the Internet and/or a Voice Over Internet Protocol (VOIP) service. The data router 204 transforms the inbound message 224 into a modified inbound message 225 to be sent via the wireless connection 130a. The example modified inbound message 225 includes the data packet of the inbound message 224 encapsulated by the short distance RF protocol used by the example wireless connection 130a. When the inbound message 224 identifies one of the subscriber identifiers and/or the temporary subscriber identifiers associated with one of the example UE 104a, the example data router 204 forwards the inbound message 224 to the specified UE 104a via the wireless connection 130a. When the inbound message 224 is a broadcast message (e.g., a paging message, etc.), the example data router 204 forwards the inbound message 224 to all the UE 104a connected to the wireless communication device 122a.

The example network connection manager 206 is communicatively coupled to the example cellular network controller 124 (FIG. 1). When the network attach request 214 is received from the wireless communication manager 202, the example network connection manager 206 instructs the example cellular network controller 124 to attach to the provider network 102 using the subscriber identifier and the authentication key included in the network attach request 214. After attaching to the provider network 102, the example cellular network controller 124 forwards inbound messages 224 received from the provider network 102 to the example network connection manager 206. The example network connection manager 208 then forwards the inbound messages 224 to the data router 204. In the illustrated example, the network connection manager 206 receives outbound messages 222 from the data router 204. The example network connection manager 206 sends the example outbound messages 222 to the example cellular network controller 124 to be sent to the provider network 102. When the example network connection manager 206 receives the network detach request 216, the example network connection manager 206 instructs the cellular network controller 124 to detach the subscriber identifier included in the network detach request 216 from the provider network 102.

In the illustrated example, the wireless communication manager 202 and the data router 204 are communicatively coupled to the wireless communication device 122a. The example wireless communication manager 202 and the example data router 204 may be communicatively coupled to one or more of the wireless communication devices 122a, 122b of FIG. 1.

While an example manner of implementing the example cellular bridge 126 of FIG. 1 is illustrated in FIG. 2, one or more of the elements, processes and/or devices illustrated in FIG. 2 may be combined, divided, re-arranged, omitted, eliminated and/or implemented in any other way. Further, the example wireless communication manager 202, the example data routers 204, the example network connection manager 206 and/or, more generally, the example cellular bridge 126 of FIG. 1 may be implemented by hardware, software, firmware and/or any combination of hardware, software and/or firmware. Thus, for example, any of the example wireless communication manager 202, the example data routers 204, the example network connection manager 206 and/or, more generally, the example cellular bridge 126 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example wireless communication manager 202, the example data routers 204, and/or the example network connection manager 206 is/are hereby expressly defined to include a tangible computer readable storage device or storage disk such as a memory, a digital versatile disk (DVD), a compact disk (CD), a Blu-ray disk, etc. storing the software and/or firmware. Further still, the example cellular bridge 126 FIG. 1 may include one or more elements, processes and/or devices in addition to, or instead of, those illustrated in FIG. 2, and/or may include more than one of any or all of the illustrated elements, processes and devices.

Figure 3:
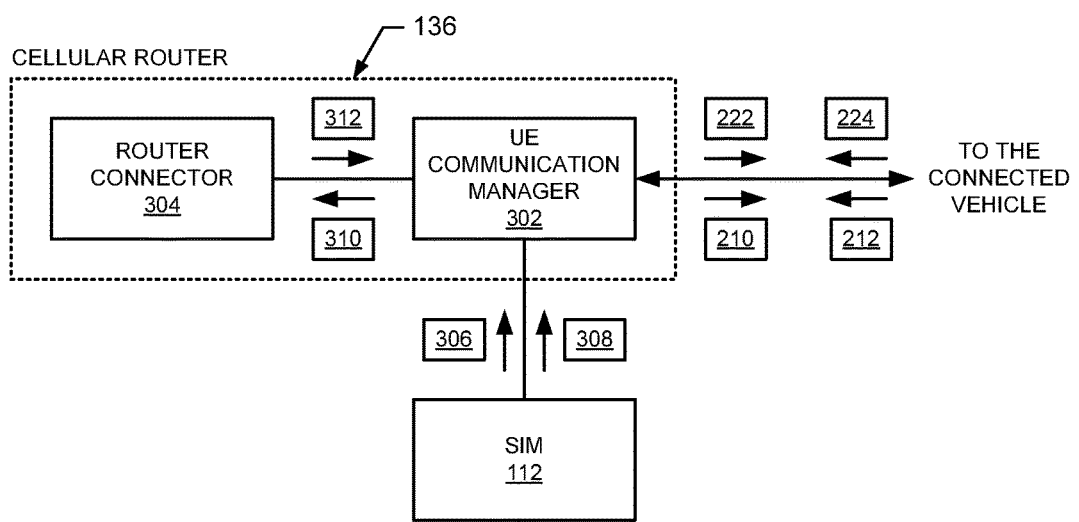
FIG. 3 illustrates an example implementation of the example cellular router of FIG. 1.

FIG. 3 illustrates an implementation of the example cellular router 136a of FIG. 1. In the illustrated example, the cellular router 136a includes an example UE communication manager 302 and an example router connector 304. The example UE communication manager 302 is structured to manage the connection relationship and the wireless connection 130a between the cellular router 136a and the cellular bridge of FIGS. 1 and 2.

In the illustrated example, to establish the connection relationship, the UE communication manager 302 exchanges the authentication credentials or the passkey with the cellular bridge 126. If the connection relationship is successfully created, the example UE communication manager 302 stores the connection relationship (e.g., in non-volatile memory) for future use. When the UE 104a (FIG. 1) is within range of the cellular bridge 126, the example UE communication manager 302 uses the stored connection relationship to establish the wireless connection 130a with the cellular bridge 126. In the illustrated example, in response to receiving a request for the registration 210, the example UE communication manager 302 retrieves the subscriber identifier 306 and the authentication key 308 stored in the example SIM 112a. In some examples, the UE communication manager 302 retrieves other information used to authenticate the UE 104a on the provider network 102 (FIG. 1). The example UE communication manager 302 generates the registration message 210 using the subscriber identifier 306 and the authentication key 308. The example UE communication manager 302 sends the registration message 210 to the cellular bridge 126 via the wireless connection 130a.

In the illustrated example, in response to receiving the UE detach request 212 from the cellular bridge 126, the UE communication manager 302 detaches the UE 104a from the provider network 102 to terminate the corresponding cellular network connection 110a (FIG. 1). In the illustrated example, the UE communication manager 302 processes inbound message 224 from the cellular bridge as if the inbound message was received from the network provider over the cellular network connection 110a. When the inbound message 224 includes a data packet 310, the example UE communication manager 302 sends the data packet to the example router interface 204. When the example UE communication manager 302 receives a data packet 312 from the example router connector 304, the example UE communication manager 302 generates an outbound message 222 using the data packet 312 and the subscriber identifier 306. The example UE communication manager 302 then sends the outbound message 222 to the cellular bridge 126 via the example wireless connection 130a.

The example router connector 304 provides an interface to the operating system of the UE 104a that allows applications executing on the UE 104a to send data packets 312 and receive data packets 310 via the cellular bridge 126 of the connected vehicle 106 (FIG. 1).

While an example manner of implementing the example cellular router 136a, 136b of FIG. 1 is illustrated in FIG. 3, one or more of the elements, processes and/or devices illustrated in FIG. 3 may be combined, divided, re-arranged, omitted, eliminated and/or implemented in any other way. Further, the example UE communication manager 302, the example router connector 304, and/or, more generally, the example cellular router 136a, 136b of FIG. 1 may be implemented by hardware, software, firmware and/or any combination of hardware, software and/or firmware. Thus, for example, any of the example UE communication manager 302, the example router connector 304, and/or, more generally, the example cellular router 136a, 136b could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example UE communication manager 302 and/or the example router connector 304 is/are hereby expressly defined to include a tangible computer readable storage device or storage disk such as a memory, a digital versatile disk (DVD), a compact disk (CD), a Blu-ray disk, etc. storing the software and/or firmware. Further still, the example cellular router 136a, 136b of FIG. 1 may include one or more elements, processes and/or devices in addition to, or instead of, those illustrated in FIG. 3, and/or may include more than one of any or all of the illustrated elements, processes and devices.

Figure 4:
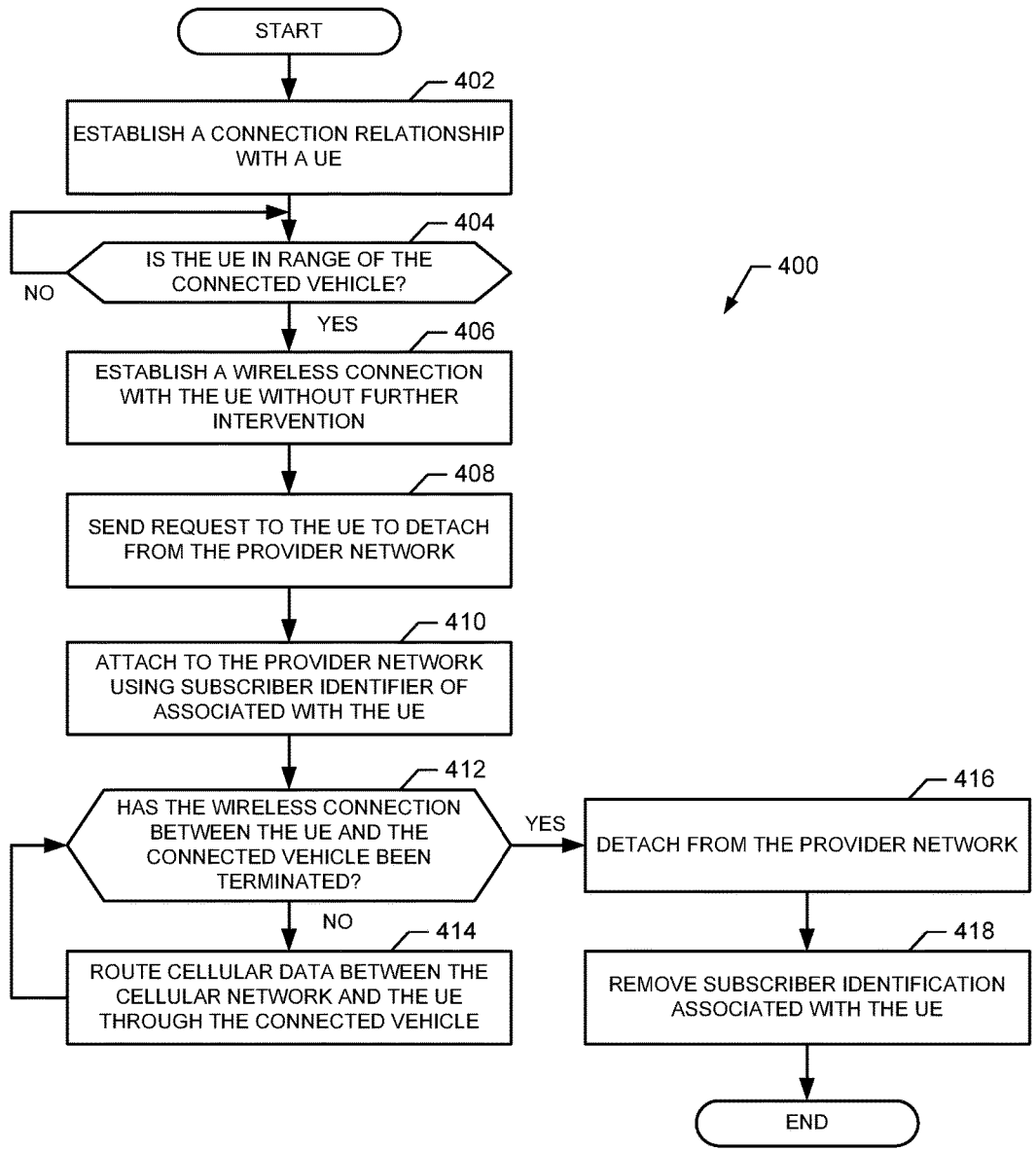
FIG. 4 is a flow diagram representative of example machine readable instructions that may be executed to implement the example cellular bridge of FIGS. 1 and/or 2 to improve connectivity between the user equipment (UE) and the provider network via the example connected vehicle of FIG. 1.

A flowchart representative of example machine readable instructions for implementing the example cellular bridge 126 of FIGS. 1 and 2 is shown in FIG. 4. In this example, the machine readable instructions comprise program for execution by a processor such as the processor 612 shown in the example processor platform 600 discussed below in connection with FIG. 6. The program may be embodied in software stored on a tangible computer readable storage medium such as a CD-ROM, a floppy disk, a hard drive, a digital versatile disk (DVD), a Blu-ray disk, or a memory associated with the processor 612, but the entire program(s) and/or parts thereof could alternatively be executed by a device other than the processor 612 and/or embodied in firmware or dedicated hardware. Further, although the example program(s) is/are described with reference to the flowcharts illustrated in FIG. 4, many other methods of implementing the example cellular bridge 126 may alternatively be used. For example, the order of execution of the blocks may be changed, and/or some of the blocks described may be changed, eliminated, or combined.

Figure 5:
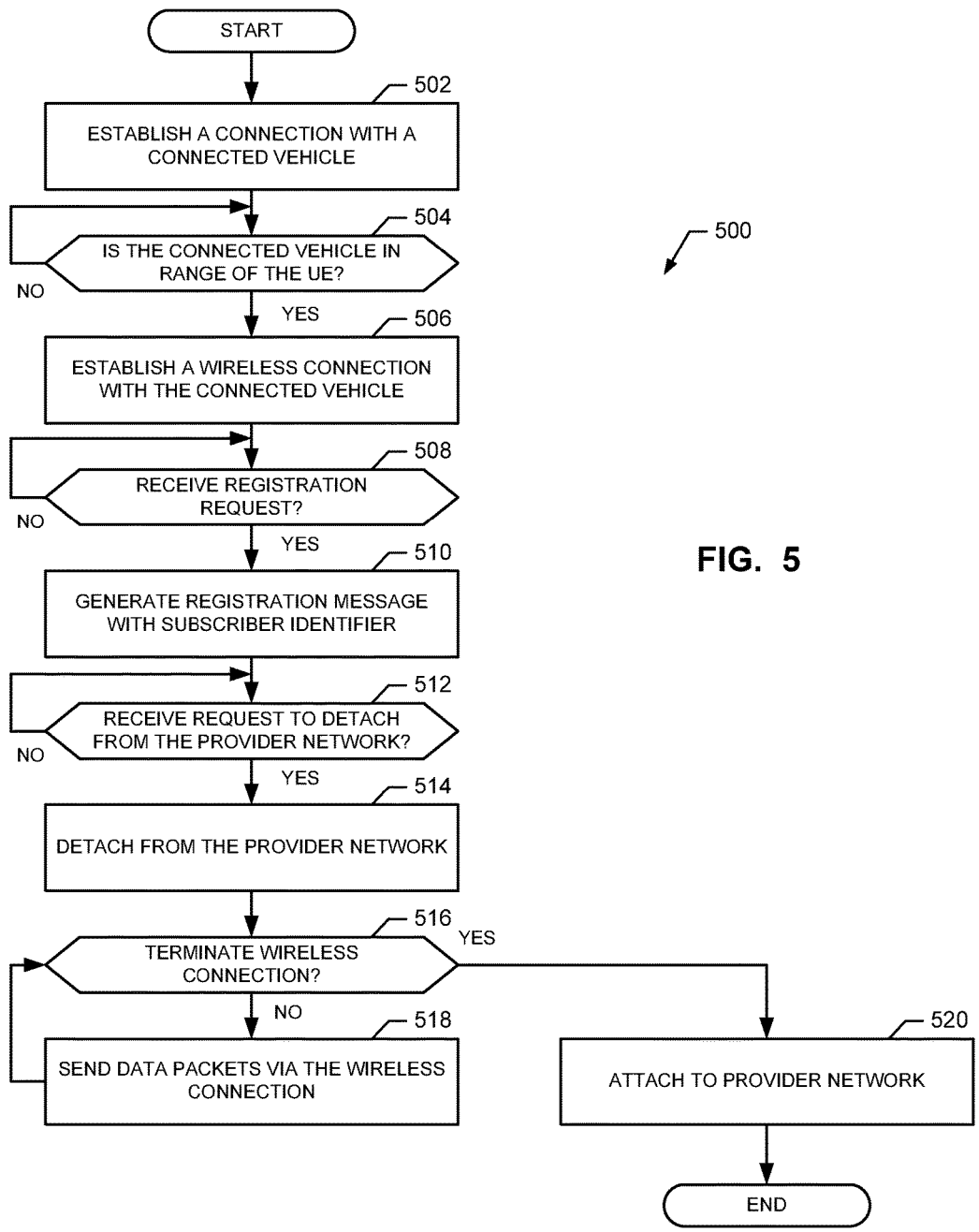
FIG. 5. is a flow diagram representative of example machine readable instructions that may be executed to implement the example cellular router of FIGS. 1 and/or 3 to improve connectivity between the example UE and the provider network via example the connected vehicle of FIG. 1.

A flowchart representative of example machine readable instructions for implementing the example cellular router 136a, 136b of FIGS. 1 and 3 are shown in FIG. 5. In this example, the machine readable instructions comprise a program for execution by a processor such as the processor 712 shown in the example processor platform 700 discussed below in connection with FIG. 7. The program may be embodied in software stored on a tangible computer readable storage medium such as a CD-ROM, a floppy disk, a hard drive, a digital versatile disk (DVD), a Blu-ray disk, or a memory associated with the processor 712, but the entire program(s) and/or parts thereof could alternatively be executed by a device other than the processor 712 and/or embodied in firmware or dedicated hardware. Further, although the example program(s) is/are described with reference to the flowcharts illustrated in FIG. 5, many other methods of implementing the example cellular router 136a, 136b may alternatively be used. For example, the order of execution of the blocks may be changed, and/or some of the blocks described may be changed, eliminated, or combined.

As mentioned above, the example processes of FIGS. 4 and/or 5 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 4 and/or 5 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 4 is a flow diagram representative of example machine readable instructions 400 that may be executed to implement the example cellular bridge 126 of FIGS. 1 and/or 2 to improve connectivity between the example UE(s) 104a, 104b (FIG. 1) and the provider network 102 (FIG. 1) via the connected vehicle 106 (FIG. 1). Initially, the example wireless communication manager 202 establishes a connection relationship with the UE 104a, 104b (block 402). The example wireless communication manager 202 determines whether one of the UEs 104a, 104b with which the example wireless communication manager 202 has establish the connection relationship is within the range of the connected vehicle 106 (FIG. 1) (block 404). If one of the UEs 104a, 104b with which the example wireless communication manager 202 has establish the connection relationship is within the range, the example wireless communication manager 202 establishes the wireless connection 130a, 130b with the UE 104a, 104b without further intervention from a user of the UE 104a, 104b (block 406). Otherwise, the example wireless communication manager 202 continues to wait unit one of the UEs 104a, 104b with which the example wireless communication manager 202 has establish the connection relationship is within the range. The example wireless communication manager 202 sends a request to detach from the provider network 102 (e.g., via the UE detach request 212 of FIGS. 2 and 3) to the UE 104a, 104b via the wireless connection 130a, 130b (block 408).

The example network connection manager 206 causes the connected vehicle 106 to attach to the provider network 102 using the subscriber identifier (e.g., the subscriber identifier 306 of FIG. 3) associated with the UE 104a, 104b (block 410). The example wireless communication manager 202 whether the wireless connection 130a, 130b with the example UE 104a, 104b has been terminated (e.g., by the example UE(s) 104a, 104b) (block 412). If the wireless connection 130a, 130b has not been terminated, the example data router 204 routes data (e.g., the inbound messages 224 and the outbound messages 222 of FIGS. 2 and 3) between the provider network 102 and the example UE 104a, 104b (block 414). Otherwise, if the wireless connection 130a, 130b has been terminated, the example network connection manager 206 causes the connected vehicle 106 to detach the cellular connection 132 associated with the subscriber identifier 306 from the provider network 102 (block 416). The example wireless communication manager 202 instructs the example data router 204 to remove the subscriber identifier associated with the UE 104a, 104b from the example account table 220 (FIG. 2) (block 418). The example program 400 then ends.

FIG. 5. is a flow diagram representative of example machine readable instructions 500 that may be executed to implement the example cellular router 136a of FIGS. 1 and/or 3 to improve connectivity between the example UE(s) 104a (FIG. 1) and the provider network 102 (FIG. 1) via the connected vehicle 106 (FIG. 1). Initially, the example UE communication manager 302 establishes a connection relationship with the connected vehicle (block 502). The example UE communication manager 302 determines whether the connected vehicle 106 with which the example UE communication manager 302 has establish the connection relationship is within the range of the UE 104a (FIG. 1) (block 504). If the connected vehicle 106 with which the example UE communication manager 302 has establish the connection relationship is within the range, the example UE communication manager 302 establishes the wireless connection 130a with the connected vehicle 106 (block 506). Otherwise, the example UE communication manager 302 continues to wait unit the connected vehicle with which the example UE communication manager 302 has establish the connection relationship is within the range.

The example UE communication manager 302 waits until a registration request is received from the connected vehicle 106 via the wireless connection 130a established at block 506 (block 508). When the registration request is received, the example UE communication manager 302 generates a registration message (e.g., the registration message 210 of FIGS. 2 and 3) with the subscriber identifier 306 (FIG. 3) stored in the SIM 112a (FIGS. 1 and 3) of the UE 104a (block 510). In some examples, the UE communication manager 302 also includes the authentication key 308 stored in the SIM 112a and/or any other information used to authenticate the UE 104a on the provider network 102. The example UE communication manager 302 waits until a request to detach from the provider network 102 (e.g., via the UE detach request 212 of FIGS. 2 and 3) is received from the connected vehicle 106 via the wireless connection 130a (block 512). When the request to detach from the provider network 102 is received, the example UE communication manager 302 detaches from the provider network 102 (block 514).

The example UE communication manager 302 determines whether to terminate the wireless connection 130a (block 516). For example, the user of the UE 104a may disable the short distance RF protocol used to establish the wireless connection 130a. As another example, the UE 104a may move out of the range of the connected vehicle 106. If the example UE communication manager 302 determines not to terminate the wireless connection 130a, the example router connector 304 sends data packets 312 via the wireless connection 130a instead of the cellular connection 132 (block 518). Otherwise, if the example UE communication manager 302 determines not to terminate the wireless connection 130a, the example UE communication manager 302 attaches to the provider network 102 to establish the direct cellular connection 110a (520). The example program 500 then ends.

Figure 6:
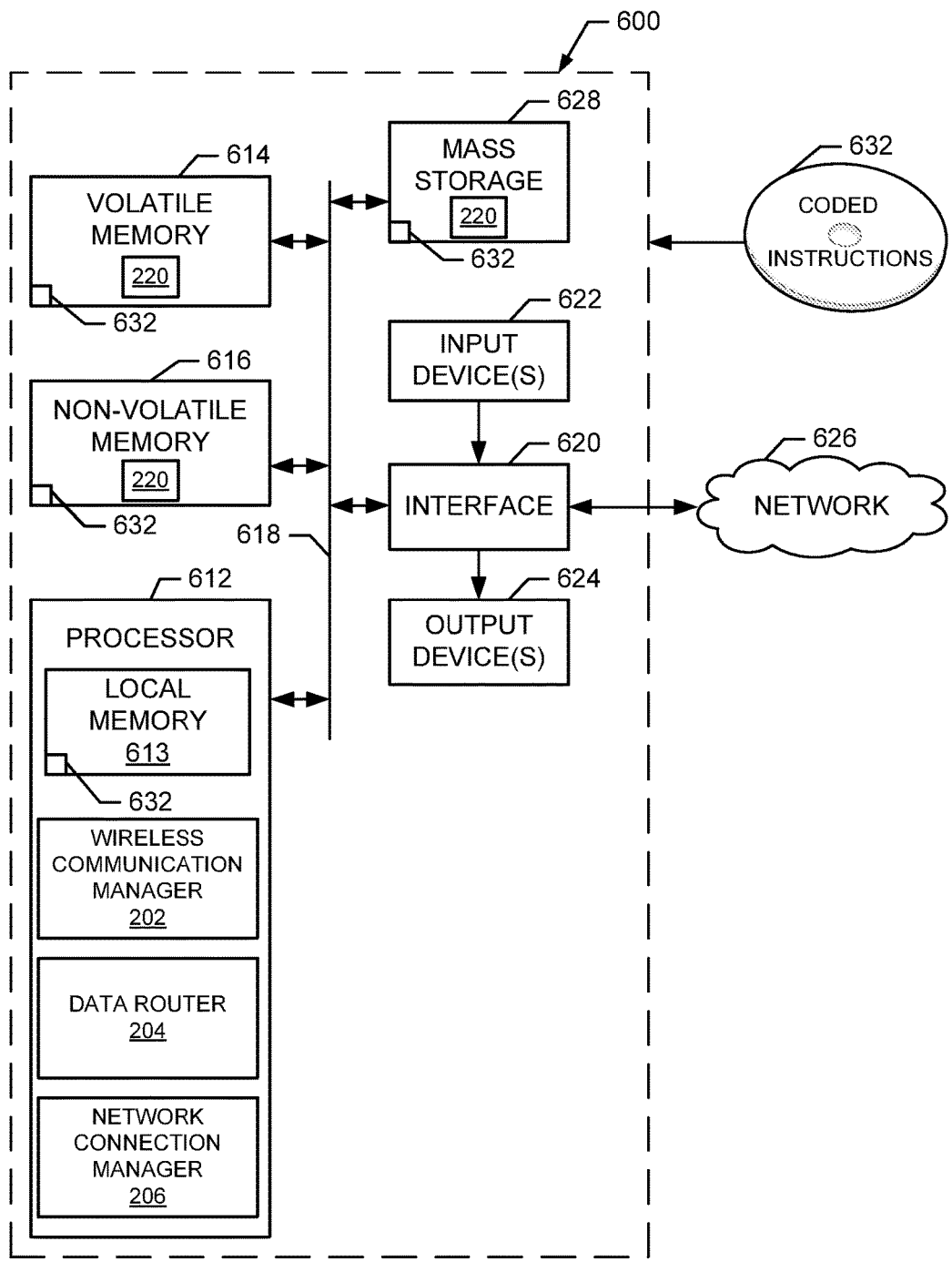
FIG. 6 is a block diagram of an example processor system structured to execute the example machine readable instructions represented by FIG. 4 to implement the example cellular bridge of FIGS. 1 and/or 2.

FIG. 6 is a block diagram of an example processor platform 1000 structured to execute the instructions 400 of FIG. 4 to implement the example cellular bridge 126 of FIGS. 1 and/or 2. The processor platform 600 can be, for example, implemented by one or more integrated circuits, logic circuits, microprocessors or controllers from any desired family or manufacturer.

The processor platform 600 of the illustrated example includes a processor 612. The processor 612 of the illustrated example is hardware. For example, the processor 612 can be implemented by one or more integrated circuits, logic circuits, microprocessors or controllers from any desired family or manufacturer. In the illustrated example, the processor 612 is structured to include the example wireless communication manager 202, the example data router 204, and the example network connection manager 206.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 616 may be implemented by flash memory and/or any other desired type of memory device. Access to the main memory 614, 616 is controlled by a memory controller. In the illustrated example, the account table 220 may be stored in the example volatile memory 614, the example non-volatile memory 616, and/or an example mass storage device 628.

The processor platform 600 of the illustrated example also includes an interface circuit 620. The interface circuit 620 may be implemented by any type of interface standard, such as an Ethernet interface, a universal serial bus (USB), and/or a PCI express interface.

In the illustrated example, one or more input devices 622 are connected to the interface circuit 620. The input device(s) 622 permit(s) a user to enter data and commands into the processor 1012. The input device(s) can be implemented by, for example, an audio sensor, a microphone, a button, a touchscreen, a track-pad, a trackball, and/or a voice recognition system.

One or more output devices 624 are also connected to the interface circuit 620 of the illustrated example. The output devices 1024 can be implemented, for example, by display devices (e.g., a light emitting diode (LED), an organic light emitting diode (OLED), a liquid crystal display, a touchscreen, etc.). The interface circuit 620 of the illustrated example, thus, typically includes a graphics driver card, a graphics driver chip or a graphics driver processor.

The interface circuit 620 of the illustrated example also includes a communication device such as a transmitter, a receiver, a transceiver, a modem and/or network interface card to facilitate exchange of data with external machines (e.g., computing devices of any kind) via an internal network 626 (e.g., an Ethernet network, a CAN bus, etc.).

The processor platform 600 of the illustrated example also includes one or more mass storage devices 628 for storing software and/or data. Examples of such mass storage devices 628 include hard drive disks, RAID systems, and solid state drives.

Coded instructions 632 of FIG. 4 may be stored in the mass storage device 628, in the volatile memory 614, and/or in the non-volatile memory 616.

Figure 7:
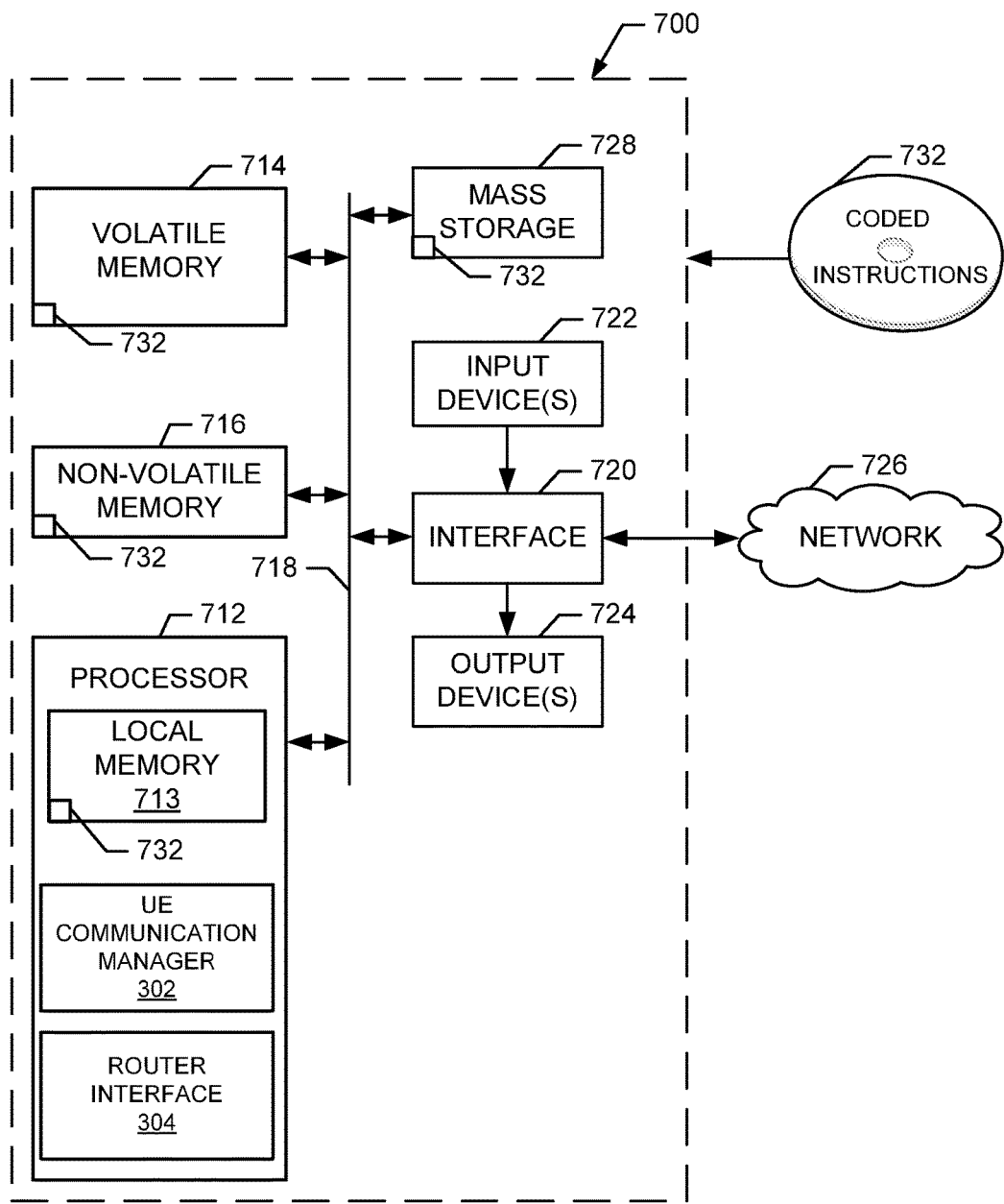
FIG. 7 is a block diagram of an example processor system structured to execute the example machine readable instructions represented by FIG. 5 to implement the example cellular router of FIGS. 1 and/or 3.

FIG. 7 is a block diagram of an example processor platform 1000 structured to execute the instructions 500 of FIG. 5 to implement the example cellular router 136a, 136b of FIGS. 1 and/or 3. The processor platform 700 can be, for example, a smartphone, a feature phone, a laptop, a tablet, an Internet appliance, or a portable gaming device, etc.

The processor platform 700 of the illustrated example includes a processor 712. The processor 712 of the illustrated example is hardware. For example, the processor 712 can be implemented by one or more integrated circuits, logic circuits, microprocessors or controllers from any desired family or manufacturer. In the illustrated example, the processor 712 is structured to include the example UE communication manager 302, and the example router connector 304.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), and/or a PCI express interface.

In the illustrated example, one or more input devices 722 are connected to the interface circuit 720. The input device(s) 622 permit(s) a user to enter data and commands into the processor 712. The input device(s) can be implemented by, for example, an audio sensor, a microphone, a button, a touchscreen, a track-pad, a trackball, and/or a voice recognition system.

One or more output devices 724 are also connected to the interface circuit 720 of the illustrated example. The output devices 1024 can be implemented, for example, by display devices (e.g., a light emitting diode (LED), an organic light emitting diode (OLED), a liquid crystal display, a touchscreen, etc.). The interface circuit 720 of the illustrated example, thus, typically includes a graphics driver card, a graphics driver chip or a graphics driver processor.

The interface circuit 720 of the illustrated example also includes a communication device such as a transmitter, a receiver, a transceiver, a modem and/or network interface card to facilitate exchange of data with external machines (e.g., computing devices of any kind) via an internal network 726 (e.g., an Ethernet network, a cellular network, etc.).

The processor platform 700 of the illustrated example also includes one or more mass storage devices 728 for storing software and/or data. Examples of such mass storage devices 728 include hard drive disks and solid state drives.

Coded instructions 732 of FIG. 5 may be stored in the mass storage device 728, in the volatile memory 714, and/or in the non-volatile memory 716.

From the foregoing, it will appreciate that the above disclosed methods and apparatus to improve a network connection of a cellular-enabled device via a connected vehicle. Because the connected vehicle can broadcast wireless signals at a higher power than the UE, the cellular connection between the connected vehicle assisted UE and the provider network has an increased range. Additionally, the connected vehicle assisted UE does not need to broadcast a long distance RF signal. Thus, by using the antenna of the connected vehicle instead of the internal antenna of the UE, the battery life of the UE is increased. Additionally, because the connected vehicle is in a better RF environment than the UE, cellular tower may reduce the signal power required to communicate with the connected vehicle assisted UE. Reducing the signal power of the broadcasts from the cellular tower reduces interference caused by the signal to UEs communicating to the cellular tower on adjacent frequency bands, thereby allowing the tower to use narrower frequency bands. Thus, the capacity of the cellular tower to communicate with UEs is increased.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A cellular-enabled device, comprising:
a processor; and
memory to store machine readable instructions that, when executed by the processor, cause the processor to perform operations including:
establishing a first connection relationship to a cellular-enabled vehicle using a short distance radio frequency protocol; and
when the cellular-enabled device is located within a range of the cellular-enabled vehicle:
establishing a first connection to the cellular-enabled vehicle using the short distance radio frequency protocol, the first connection based on the first connection relationship;
in response to receiving a registration request from the cellular-enabled vehicle, sending a registration message including a subscriber identifier to the cellular-enabled vehicle;
in response to receiving a request to end a second connection to a cellular network, detaching from the cellular network; and
routing first cellular data associated with the cellular-enabled device between the cellular network and the cellular-enabled device via the cellular-enabled vehicle.

2. The cellular-enabled device of claim 1, wherein without the subscriber identifier, the cellular-enabled vehicle is not authorized to attach to the cellular network.

3. The cellular-enabled device of claim 1, wherein the operations further include, when the first connection is terminated, attaching to the cellular network.

4. The cellular-enabled device of claim 3, wherein the processor is to attach to the cellular network by at least one of establishing a connection relationship, becoming authorized to use the cellular network, obtaining information to transmit on the cellular network, receiving data on the cellular network, or receiving a subscriber identification between the cellular network and the cellular-enabled device.

5. The cellular-enabled device of claim 1, wherein the operations further include managing a signal strength of the short distance radio frequency protocol so that the range at which the first connection is established is substantially proximate the cellular-enabled vehicle.

6. The cellular-enabled device of claim 1, wherein the short distance radio frequency protocol is at least one of a BLUETOOTH protocol, a WI-FI protocol, or a ZIGBEE protocol.

7. The cellular-enabled device of claim 1, wherein the registration message further includes an authentication key, and the subscriber identifier and the authentication key are stored in a subscriber identification module in the cellular-enabled device.

8. The cellular-enabled device of claim 1, wherein when the cellular-enabled device is located within the range of the cellular-enabled vehicle, the first connection to the cellular-enabled vehicle is established without further intervention from a user of the cellular-enabled device.

9. The cellular-enabled device of claim 1, wherein the processor is to detach from the cellular network by informing the cellular network that the cellular-enabled device is not reachable.

10. A method for implementing a cellular network connection for a cellular-enabled device via a cellular-enabled vehicle, the method comprising:
establishing, by executing an instruction with a processor, a first connection relationship between the cellular-enabled vehicle and the cellular-enabled device using a short distance radio frequency protocol; and
when the cellular-enabled device is located within a range of the cellular-enabled vehicle:
establishing, by executing an instruction with the processor, a first connection between the cellular-enabled vehicle and the cellular-enabled device using the short distance radio frequency protocol, the first connection based on the first connection relationship;
in response to receiving a registration request from the cellular-enabled vehicle at the cellular-enabled device, sending, by executing an instruction with the processor, a registration message including a subscriber identifier from the cellular-enabled device to the cellular-enabled vehicle;
in response to receiving a request to end a second connection to a cellular network at the cellular-enabled device, detaching, by executing an instruction with the processor, the cellular-enabled device from the cellular network; and
routing, by executing an instruction with the processor, first cellular data associated with the cellular-enabled device between the cellular network and the cellular-enabled device via the cellular-enabled vehicle.

11. The method of claim 10, wherein without the subscriber identifier, the cellular-enabled vehicle is not authorized to attach to the cellular network.

12. The method of claim 10, further including, when the first connection is terminated, attaching the cellular-enabled device to the cellular network.

13. The method of claim 10, further including managing a signal strength of the short distance radio frequency protocol so that the range at which the first connection is established is substantially proximate the cellular-enabled vehicle.

14. The method of claim 10, wherein the registration message further includes an authentication key, and further including storing the subscriber identifier and the authentication key in the cellular-enabled device.

15. The method of claim 10, further including, when the cellular-enabled device is located within the range of the cellular-enabled vehicle, establishing the first connection to the cellular-enabled vehicle without further intervention from a user of the cellular-enabled device.

16. A tangible computer readable storage device or storage disk including instructions that, when executed, cause a processor to perform operations comprising:
 establishing a first connection relationship between a cellular-enabled vehicle and a cellular-enabled device using a short distance radio frequency protocol; and
 when the cellular-enabled device is located within a range of the cellular-enabled vehicle:
  establishing a first connection between the cellular-enabled vehicle and the cellular-enabled device using the short distance radio frequency protocol, the first connection based on the first connection relationship;
  in response to receiving, at the cellular-enabled device, a registration request from the cellular-enabled vehicle, sending a registration message including a subscriber identifier to the cellular-enabled vehicle from the cellular-enabled device;
  in response to receiving, at the cellular-enabled device, a request to end a second connection to a cellular network, detaching the cellular-enabled device from the cellular network; and
  routing first cellular data associated with the cellular-enabled device between the cellular network and the cellular-enabled device via the cellular-enabled vehicle.

17. The tangible computer readable storage device or storage disk of claim 16, wherein without the subscriber identifier, the cellular-enabled vehicle is not authorized to attach to the cellular network.

18. The tangible computer readable storage device or storage disk of claim 16, wherein the operations further include, when the first connection is terminated, attaching the cellular-enabled device to the cellular network.

19. The tangible computer readable storage device or storage disk of claim 16, wherein the operations further include managing a signal strength of the short distance radio frequency protocol so that the range at which the first connection is established is substantially proximate the cellular-enabled vehicle.

20. The tangible computer readable storage device or storage disk of claim 16, wherein the registration message further includes an authentication key, and the subscriber identifier and the authentication key are stored in the cellular-enabled device.

\* \* \* \* \*